UNITED STATES PATENT OFFICE.

PAUL EMILE CHARLES GOISSEDET, OF PARIS, FRANCE.

MANUFACTURE OF NEW PRODUCTS DERIVED FROM CELLULOSE.

1,357,450.  Specification of Letters Patent.  Patented Nov. 2, 1920.

No Drawing.  Application filed March 4, 1919. Serial No. 280,566.

*To all whom it may concern:*

Be it known that I, PAUL EMILE CHARLES GOISSEDET, citizen of the Republic of France, and resident of Paris, France, (post-office address 93 Rue de la Folie Mericourt,) have invented a new and useful Manufacture of New Products Derived from Cellulose, which improvements are fully set forth in the following specification.

This invention relates to a process for the production of new derivatives of cellulose.

Alcohols or phenols act upon the aliphatic or aromatic isocyanates and produce esters of the alkyl- or aryl carbamic acids.

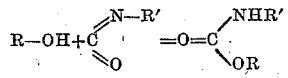

It has been found that this reaction can be applied to cellulose.

If for example phenyl isocyanate is allowed to act upon cellulose in the presence of tertiary bases the cellulose is transformed into phenyl carbamic esters, which can be applied to the same uses as the cellulose esters.

By way of example; 1 part of dried cotton cellulose and 3 parts phenyl isocyanate diluted with dry pyridin are heated together. The cotton fibers disappear and a colloidal solution is obtained from which the resulting phenyl carbamic ester is easily isolated.

Phenylisocyanate can be replaced by any aliphatic or aromatic isocyanates.

The process may be carried out in the presence of tertiary bases either singly or intermixed.

The dilution may be effected with any suitable solvent.

What I claim as new and desire to secure by Letters Patent of the United States is:—

1. The process for the production of new derivatives of cellulose which comprises treating cellulose with an isocyanic ester.

2. The process for the production of new derivatives of cellulose which comprises treating cellulose with an aromatic isocyanic ester.

3. The process for the production of new derivatives of cellulose which comprises heating cellulose with an isocyanic ester in the presence of a tertiary base.

4. The process for the production of new derivatives of cellulose which comprises heating cellulose with an aromatic isocyanic ester in the presence of a tertiary base.

5. The process for the production of new derivatives of cotton cellulose which comprises heating dried cotton cellulose with about three times its weight of an isocyanic ester in the presence of anhydrous pyridin and separating out the resulting carbamic ester.

6. The process for the production of new derivatives of cellulose which comprises heating cellulose with an isocyanic ester in the presence of pyridin, and separating out the resulting carbamic ester.

7. The process for the production of new derivatives of cellulose which comprises heating dried cotton cellulose with an isocyanic ester in the presence of a tertiary base, and separating out the resulting carbamic ester.

8. The process for the production of new derivatives of cellulose which comprises heating cellulose with phenyl isocyanate in the presence of a tertiary base, and separating out the resulting phenyl carbamic ester.

9. The process for the production of new derivatives of cellulose which comprises heating cellulose with phenyl isocyanate in the presence of pyridin, and separating out the resulting phenyl carbamic ester.

10. The process for the production of the new derivatives of cellulose which comprises heating cellulose with an aromatic isocyanic ester in the presence of pyridin, and separating out the resulting carbamic ester.

11. As an article of manufacture the new products obtained by the reaction of an isocyanic ester on cellulose.

In testimony whereof I have signed this specification.

PAUL EMILE CHARLES GOISSEDET.